United States Patent

Wahlqvist

[11] Patent Number: 5,527,080
[45] Date of Patent: Jun. 18, 1996

[54] ARRANGEMENT AND PROCESS FOR FASTENING A SEAT TO A SEAT BASE IN A VEHICLE

[75] Inventor: Rolf Wahlqvist, Irosa, Sweden

[73] Assignee: Scania CV Aktiebolag, Sweden

[21] Appl. No.: 258,321

[22] Filed: Jun. 10, 1994

[30] Foreign Application Priority Data

Jun. 11, 1993 [SE] Sweden .................. 9302012

[51] Int. Cl.[6] ......................................... B60N 2/00
[52] U.S. Cl. ......................................... 296/63; 248/503.1
[58] Field of Search ........................ 248/503.1; 296/63, 296/65.1

[56] References Cited

U.S. PATENT DOCUMENTS

| | | | |
|---|---|---|---|
| 3,317,175 | 5/1967 | Ford | 296/65.1 X |
| 3,779,503 | 12/1973 | Lombardo, Sr. | 248/429 |
| 3,961,767 | 6/1976 | Albrecht et al. | 248/503.1 |
| 4,516,811 | 5/1985 | Akiyama et al. | 296/65.1 X |
| 4,691,946 | 9/1987 | Sburlati et al. | 296/65.1 X |
| 4,830,422 | 5/1989 | Levitre | 296/65.1 |

FOREIGN PATENT DOCUMENTS

| | | | |
|---|---|---|---|
| 116279 | 8/1984 | European Pat. Off. | 248/503.1 |
| 0171660 | 2/1986 | European Pat. Off. | |
| 0283356 | 9/1988 | European Pat. Off. | |
| 0356004 | 2/1990 | European Pat. Off. | |
| 442765 | 8/1991 | European Pat. Off. | 248/503.1 |
| 0543684 | 5/1993 | European Pat. Off. | |
| 809026 | 7/1951 | Germany | 296/65.1 |
| 2448139 | 4/1976 | Germany | |
| 3708398 | 9/1987 | Germany | 296/65.1 |
| 3706395 | 9/1988 | Germany | |
| 4304968 | 8/1991 | Germany | 248/503.1 |
| 3106821 | 9/1992 | Germany | |
| 4224839 | 2/1994 | Germany | 248/503.1 |

*Primary Examiner*—Dennis H. Pedder
*Attorney, Agent, or Firm*—Ostrolenk, Faber, Gerb & Soffen

[57] ABSTRACT

A fastening arrangement for a vehicle seat (4) includes floor fastening elements (20, 21) connected to the vehicle floor and corresponding seat fastening devices (26, 27) attached to the seat (4). The fastening elements (20, 26) situated furthest from the door form in the assembled position a spring-loaded push-in connection. To this end, the floor fastening element (20) has a hole (15) through it and the seat fastening element (26) is provided with a protruding peg (32). The seat is introduced through the door at an angle to the horizontal plane, and the seat fastening element (26) of the push-in connection includes guiding teeth (33) which are applied to a floor guide device (14). The seat (4) is thereafter moved along the guide devoce so that the peg (32) is introduced into the hole (15) in the floor fastening element (20). The opposite side of the seat (4) is then pressed down so that the seat fastening element (27) on that side is brought into a wedging contact with the floor fastening element (21). The seat (4) is locked in the final position by means of a bolt which is fitted by a robot.

16 Claims, 4 Drawing Sheets

ARRANGEMENT AND PROCESS FOR FASTENING A SEAT TO A SEAT BASE IN A VEHICLE The present invention refers to an arrangement for fastening a seat to a seat base in a vehicle and a process for fitting such a seat in a vehicle.

STATE OF THE ART

The motor vehicle industry is constantly looking for ways to reduce production costs. Automation of assembly by means of robots has been the solution for many operations. However, it has not been possible to robotise certain kinds of assembly work because robots require a certain working space and cannot travel along absolutely geometrical paths without being hindered by elements of bodywork. This has resulted in some work having still to be carried out manually at a very angry high assembly cost compared with automated operations. An example of such an operation is the fitting of vehicle seats. The actual fastening of a seat to the floor does not of itself involve any real problem. This is commonly achieved by bolted connections at the four corners of the seat, with the bolts normally firmly screwed vertically into corresponding mounting holes. The real difficulty lies in the small space, available for assembly movements under the seat, which means that robots cannot be used, that the working position for fitters is awkward and ergonomically incorrect and that the time and cost of the work are very great. A further disadvantage that may be cited is that positioning the seat very often causes problems and that many minor adjusting movements may be required before the correct position is achieved.

EP-A2-0356004 attempted to remedy the above-mentioned disadvantages and indicate a method and a fastening arrangement which permit robotisation of the seat fastening operation. This involves bolted connections being used to secure the seat, and the seat frame having external fastening lugs provided with holes which allow screws to be inserted and the seat to be secured to the floor. Unfortunately, the known technique involves a number of disadvantages in that it requires the seat to be made collapsible so that the fastening lugs situated on the sides can be reached by the robot's assembling device or by the fitter. This means inter alia that a special track has to be designed and that the seat has to be provided with locking devices which cooperate with corresponding locking devices in the frame in order to prevent the seat swinging up land down. This leads to the known design having a considerable production cost and to there having to be additional special manual hinging-up and hinging-down operations.

OBJECT OF THE INVENTION

The purpose of the invention is to indicate an arrangement and a process which eliminate the abovementioned disadvantages and afford a possibility of automated fitting of seats in vehicles by means of robots resulting in substantial time and cost saving or which, if the seats are fitted manually, allow fitting to be carried out in a manner ergonomically correct for the fitter.

The invention concerns a fastening arrangement for simply fastening a vehicle seat, by the vehicle seat frame, to the seat base in a vehicle, preferably by the action of robots. The vehicle seat is on a frame which includes at least first and second spaced apart fastening elements in the form of downwardly extending shanks. The seat base on the vehicle floor includes respective third and fourth upstanding shank-like fastening elements which engage the respective first and second fastening elements on the seat frame. The first and third fastening elements remote from the door of the vehicle through which the seat frame is introduced include a protruding peg in hole arrangement for a push in connection between the first and third fastening elements when the seat frame is pushed into and across the vehicle. After the push in connection is established, the second and fourth fastening elements are brought together and a locking connection is made between them by a locking element which is accessible from the outside of the vehicle through the door through which the seat base was introduced.

In a preferred form, the seat frame is installed and moved across the vehicle tilted at an angle with respect to the seat base, and the seat frame is guided by cooperating guide means located on the first fastening element and on the seat base until the seat frame has been moved to establish the push in connection. Thereafter the seat frame is moved with respect to the seat base to bring the second and fourth fastening elements together, and the second and fourth fastening elements are then locked together.

BRIEF DESCRIPTION OF THE DRAWINGS

A more detailed account of examples of preferred embodiments of the invention appears below with reference to the accompanying drawings, in which.

DETAILED DESCRIPTION OF AN EMBODIMENT EXAMPLE

Figure 1:
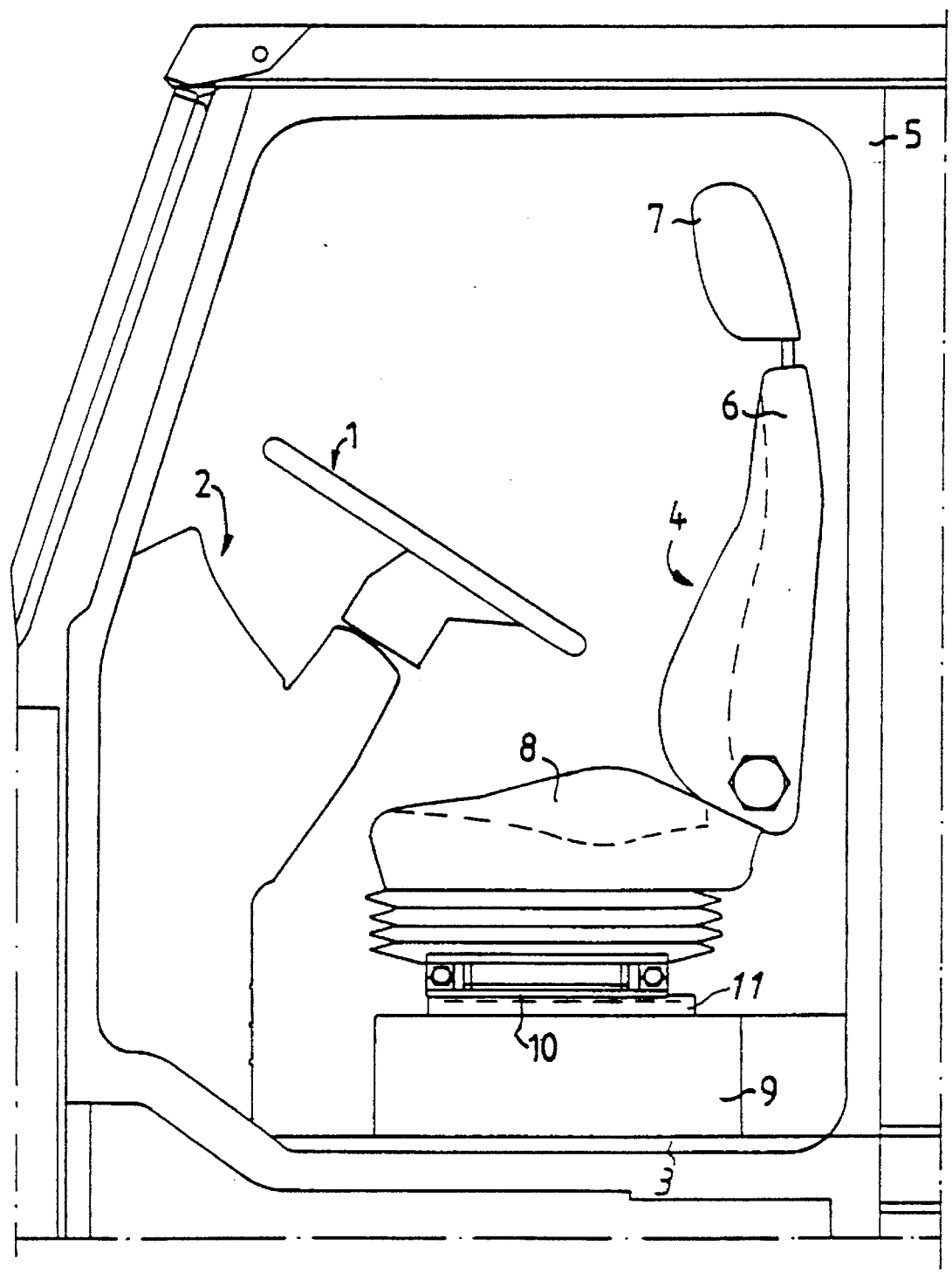
FIG. 1 is a side view of part of a driver's cab in a lorry with a seat shown in the fitted position.

FIG. 1 shows the driver's side of a compartment space in a vehicle cab. The compartment space is provided with a cab floor 3 which in its front portion connects with a cab forward wall 2 which protrudes into the cab and accommodates a steering column 1. A vehicle seat 4 with sitting surface 8, back support 6 and neck support 7 is fastened to a seat base and is movable in the longitudinal direction along rails 11 between an extreme forward position and an extreme rearward position relative to the floor 3. Accordingly the seat 4 can be locked in a conventional manner in any chosen position along the rails 11 in order to set a driving position suitable for the driver. As neither the rails 11 nor the locking mechanism form part of the invention, the location of the rails 11 is only shown schematically and the locking mechanism is not shown at all. The seat base may consist of the floor 3 itself or, as in this case, a support 9 which is fixed to the floor 3. The rails 11 may therefore, as in this embodiment example, be placed between the seat 4 and the support 9 or between the support 9 and the floor 3 or alternatively between the seat 4 and the floor 3. The figure shows the seat 4 in a forward position in which it possible to fit it by introducing it through the cab door aperture 5.

FIG. 1 shows a seat fastening 10 placed between the seat 4 and the seat base, i.e. in this embodiment example the support 9.

Figure 2:
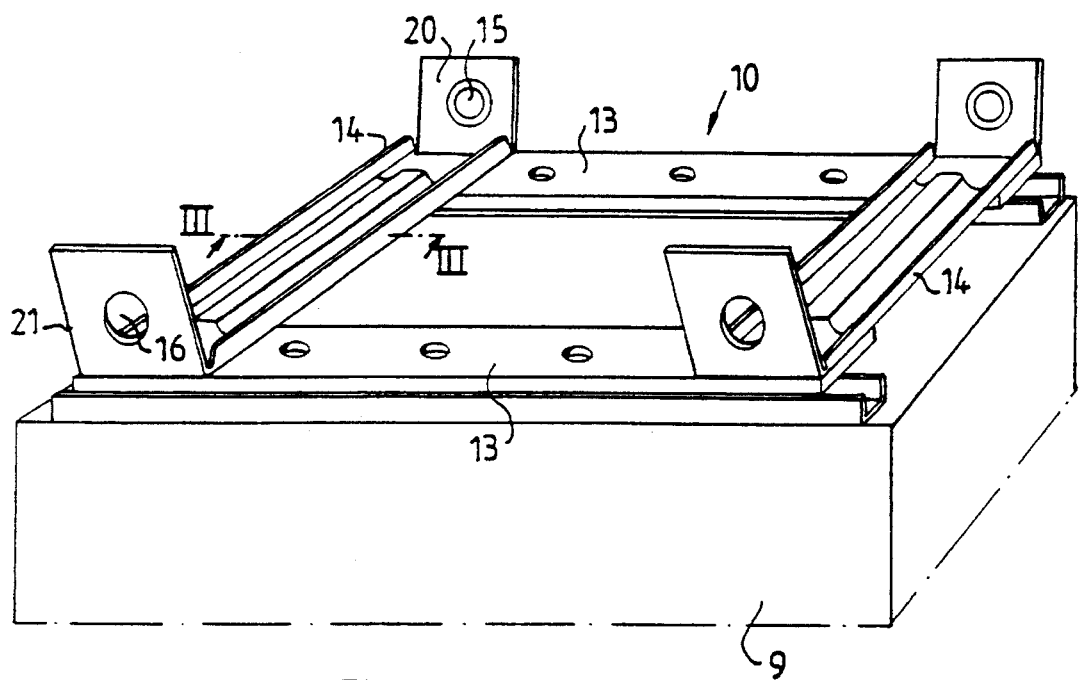
FIG. 2 shows in perspective a seat fitting frame fixed to a seat support.

FIG. 2 shows a seat fastening consisting of a substantially rectangular frame with two frame portions 13 running in the longitudinal direction of the vehicle and two transverse fastening strips 14. It is advantageous for the frame portions 13 to be connected by the transverse fastening strips 14 so as to form a largely square or rectangular frame which can readily be premounted to the support 9 by means of robot technology. The frame portions 13 may be fastened by means of any known technology, e.g. welding or threaded connections.

As illustrated, the fastening strips 14 are bent up at the ends so as to form shanks 20, 21 which have holes 15 and 16 through them. The hole 16 which is situated closest to the door is oblong or oval, while the hole 15 on the opposite side is circular.

Figure 3:
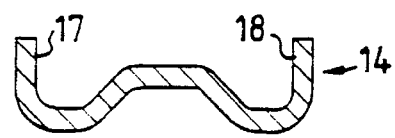
FIG. 3 shows in section a guiding portion of one of the fastening strips shown in FIG. 2.

Between the shanks 20, 21 the fastening strips 14 have a guiding portion, the cross-section of which is shown in FIG. 3. This guiding portion includes two largely vertical walls 17, 18. The walls 17, 18 provide assembly guidance for fastening devices attached to the seat. More detail on how this guidance works is given later on in connection with describing the fastening devices of the seat.

Figure 4:
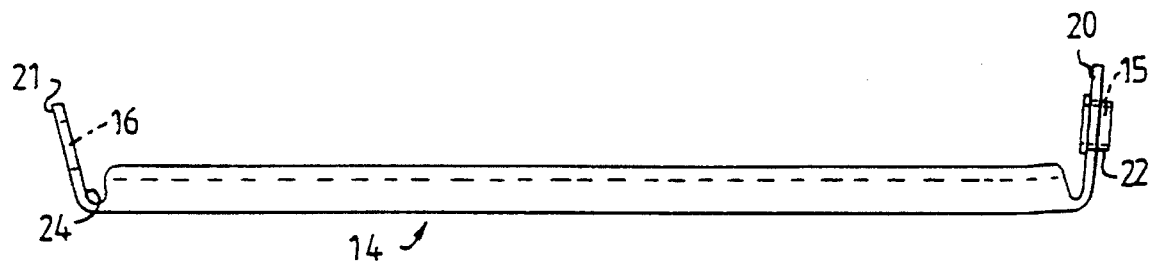
FIG. 4 is a side view of the fastening rail in FIG. 3.

FIG. 4 shows a fastening strip 14 as seen from the side. The portion situated furthest from the door is on the right of the figure. The shank 20 of the fastening strip 14 points almost vertically upwards but forms a certain small angle with the vertical plane. The shank 20 is dimensioned so that it can be bent inwards but will spring back to the position shown when the bending force is removed. It is advantageous for the hole 15 through the shank 20 to be reinforced by the wall of the being flanged or being provided, as here, with a sleeve-hole bushing 22.

The end of the fastening strip 14 nearest to the door is likewise provided with a shank 21. The latter has an internal guiding surface 24 which forms a considerably larger angle with the vertical plane than the right shank 20 in FIG. 4. Also, the hole 16 through the left shank 21 is oval or oblong.

Figure 5:
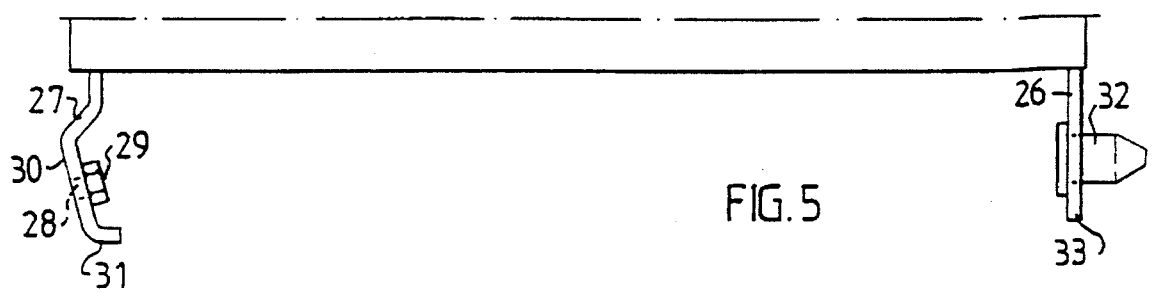
FIG. 5 is a side view of the fastening element which is attached to the seat.

The fastening elements 26, 27 on the seat which cooperate with the shanks 20, 21 of the fastening strips 14 are shown in FIG. 5, in which the seat underside is shown in the same projection as the fastening strips in FIG. 4. The left fastening element 27 nearest to the door has a hole 28 through it. A threaded nut 29 is welded firmly in front of the hole 28 on the rear of the fastening element 27. The fastening element 27 has an outer section 30 which forms an angle with the vertical plane. The angle is largely similar to that which the internal guiding surface 24 of the shank 21 forms with the vertical plane. In the fitted position, this sloping section 30 will abut against the inside of the shank 21. The continuation of this outer section 30 includes a suction 31 which is bent inwards and shaped so as to be accommodated between guiding walls 17, 18 of the fastening strip 14.

The fastening element 26 situated on the opposite side is largely planar. A guiding peg 32 protrudes substantially perpendicularly from the plate 26. The diameter of the guiding peg 32 is somewhat smaller than the diameter of the hole in the bushing 22 so that the guiding peg 32 can be inserted in the hole in the bushing 22 without any great play. The forward end of the guiding peg 32 is shaped so as to facilitate insertion in said hole.

Figure 6:
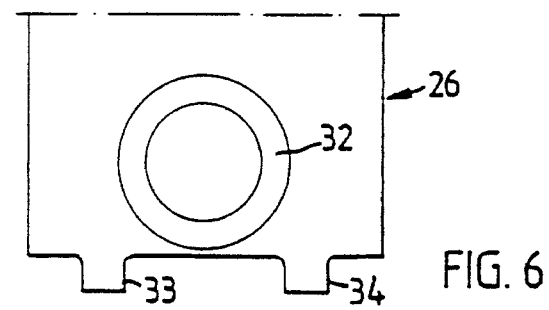
FIG. 6 shows on a larger scale part of a fastening element fitted in the seat.

FIG. 6 shows the lower end of the fastening element 26 as seen directly from the front with the perpendicularly protruding guiding peg 32. Along the bottom of it there are two guiding teeth 33, 34 protruding downwards and the distance between their outer delineating surfaces is somewhat smaller than the distance between the inner delineating surfaces of the guiding walls 17, 18. Fitting the seat involves applying the seat so that the guiding teeth 33, 34 become positioned between the guiding walls 17 and 18, with the guiding peg 32 so placed in relation to them as to enter the hole in the shank 20 when the seat is moved along the fastening strips 14 while being guided between their guiding walls 17, 18.

Figure 7:
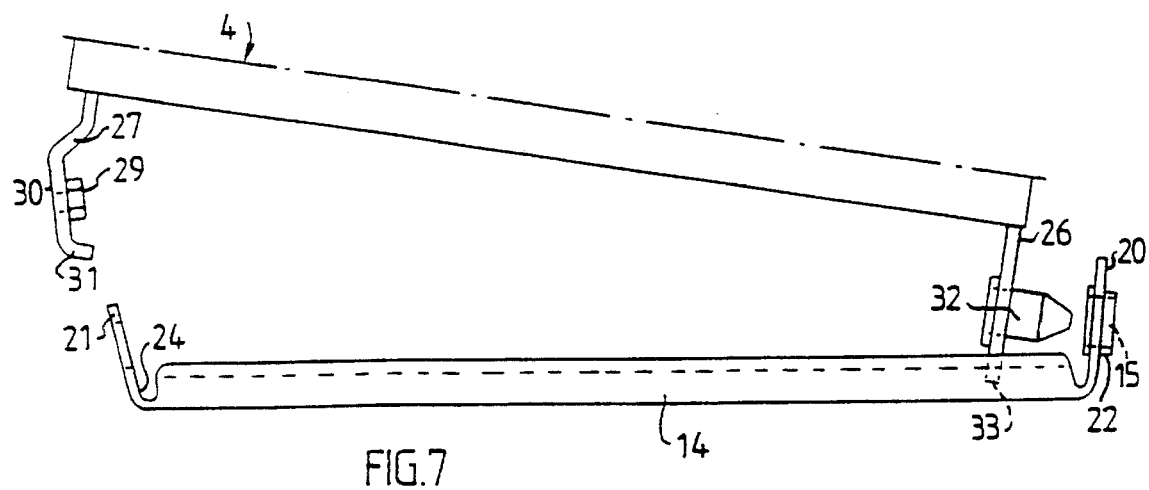
FIG. 7 shows from the side the various fastening elements involved in fitting the seat.
Figure 8:
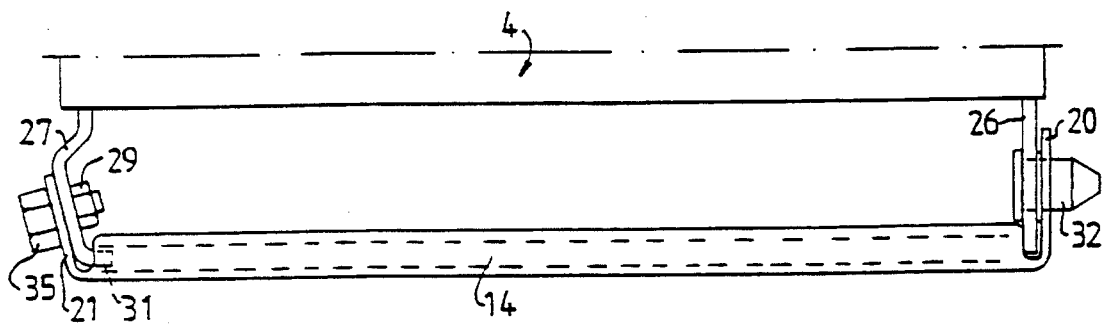
FIG. 8 shows the same as FIG. 7 after the seat has been placed in position.

How fitting takes place is best understood with reference to FIGS. 7 and 8. The seat 4 is introduced through the door, preferably by a robot, at a slight angle to the horizontal plane, so that the guiding teeth 33, 34 become positioned between the guiding walls 17, 18. Thereafter the seat 4 is moved inwards under the guidance of the fastening strip 14 and the guiding teeth engaging with the latter so that the guiding peg 32 enters the hole in the bushing 22 and the seat fastening element 27 moves freely over the upper delineating edge of the shank 21. In this position the left part of the seat 4 is rotated downwards and the surface section 30 comes into contact with the inner surface 24 of the shank 20. Continuing downward pressure makes the seat move to the right so that the guiding peg 32 enters still further into the hole in the bushing 22, while at the same time the guiding peg 32 performs a rotation movement which directs it upwards against the spring effect of the shank 21. The distances between the fastening elements 26 and 27 and between the shanks 20 and 21 are chosen such that the abutting of the fastening element 26 against the shank 20 results in the fastening element 30 never being able to bottom in the fastening strip 14. The seat 4 will now be in the fitting position and the threaded hole in the nut 29 in front of the hole in the left shank 21. The fact that this latter hole is oblong or oval means that it does not require exact positioning relative to the hole 16 in the shank 21. A bolt 35 can now be inserted through the hole 16, preferably by means of an industrial robot, and be screwed tight into the firmly welded threaded nut 29. The result is the final fitted position shown in FIG. 8. It is further observed that the bent inwards inner portion 31 of the left fastening element engages with the fastening strip 14. It may also be seen that the right shank 20 has been directed upwards to a vertical position. The spring force exerted by the right shank 20 and the wedge effect between the inner surface of the shank 21 and the sloping outer section 30 of the fastening element 27 result in play-free fastening of the seat 4. It is of course seen that the same description as above also applies to the other fastening strip and that the right and left directions refer only to the example shown in the drawings. It is essential to have a push-in connection on the side of the seat that is least readily accessible for a robot, i.e. the side situated furthest from the door.

The greatest advantage of the invention is that it allows automated fitting of a vehicle seat. The least accessible side requires no fitting work at all. Despite this, the push-in connection present here performs two functions by not only providing guidance during fitting but also fixing the seat in every direction except the working direction, movement in which is limited by the fastening element 27 and the shank 21 in cooperation with the bolt 29. On this side the assembly area is readily accessible from the outside and the two bolts required for fixing the seat can be individually inserted and screwed tight by means of a robot.

It may also be seen that even if it is decided not to use automated fitting, the fitter's work is facilitated as compared with traditionally known seat fitting, resulting in considerable time gain.

ALTERNATIVE EMBODIMENTS OF THE INVENTION

It may be seen that the invention may be varied in different ways. For instance, in the embodiment example the frame includes two frame portions. It is of course possible to include more of these if this is found necessary for strength reasons. The push-in connection may also be designed differently. Instead of having the guiding peg 32 on the seat fastening element 26 and the hole in the shank 21, the situation may be reversed. It is also possible to conceive using, instead of a guiding peg with a hole, other forms of protrusion which cooperate with recesses in the other element, e.g. suitably designed webs and grooves. And instead of screwed connections, it is of course possible to use other types of connection, such as riveting, welding or the like.

The assembly guidance can of course be varied in different ways and possibly be omitted. It would for example be conceivable for guidance to be provided by an arched strip engaging with a recess in the lower portion of the fastening device 26.

I claim:

1. An arrangement for fastening a seat to a seat base in a vehicle, comprising:

the seat including first and second spaced apart fastening elements attached to the seat;

the seat base to which the seat is connectable including respective third and fourth fastening elements attached to it, with the third fastening element adapted to cooperate with the first fastening element and the fourth fastening element adapted to cooperate with the second fastening element;

push in connection means at the first and third fastening elements such that when the first and third fastening elements are brought together with the seat being brought to the seat base, a push in connection is made between the first and third fastening elements, the first and third fastening elements being structured and arranged so that a spring force is exerted therebetween when the push in connection is made;

the second and fourth fastening elements being adapted to be brought together, the second and fourth fastening elements being structured and arranged such that a wedge effect is established therebetween when the second and fourth elements are brought together, and a locking element for locking the second and fourth fastening elements together, the second and fourth fastening elements and the locking element being so placed with respect to the seat and the seat base that the locking element defines a locking connection between the second and fourth fastening elements, and the locking connection is accessible from a side of the vehicle through which the seat is installed, the wedge effect established between the second and fourth fastening elements and the spring force between the first and third fastening elements causing a play-free fastening of the seat to the seat base.

2. The arrangement of claim 1, wherein the push in connection means comprise a peg on one of the first and third fastening elements and a hole in the other of the first and third fastening elements for receiving the peg which is pushed in the hole when the first and third fastening elements are brought together.

3. The arrangement of claim 2, wherein the one of the first and third fastening elements having a hole therethrough is resilient, and wherein the first and third fastening elements on the one hand and the second and fourth fastening elements on the other hand are so placed and shaped that after the seat frame is fitted to the seat base, the resilient fastening element applies the spring force to the peg.

4. The arrangement of claim 3, wherein the one of the first and third fastening elements having a hole comprises a plate and before the plate is engaged by the peg and before the plate applies the spring force, it forms a small angle to a vertical plane through the seat and the seat base.

5. The arrangement of claim 1, wherein each of the third and fourth fastening elements on the seat base comprises a respective upstanding shank extending up from the base; each of the first and second fastening elements comprises a respective downwardly extending shank for cooperating with the respective one of the first and second fastening elements.

6. The arrangement of claim 5, wherein the push in connection means comprise a peg on one of the first and third fastening elements and a hole in the other of the first and third fastening elements for receiving the peg which is pushed in the hole when the first and third fastening elements are brought together; the one of the first and third fastening elements having a hole therethrough is resilient, and wherein the first and third fastening elements on the one hand and the second and fourth fastening elements on the other hand are so placed and shaped that after the seat is fitted to the seat base, the resilient fastening element applies the spring force to the peg.

7. The arrangement of claim 6, wherein the one of the first and third fastening elements having a hole comprises a plate which, before the plate is engaged by the peg and before the plate applies the spring force, it forms a small angle to a vertical plane through the seat and the seat base.

8. The arrangement of claim 7, wherein the fourth fastening element includes an inclined guiding surface and the second fastening element on the seat has a correspondingly inclined cooperating guiding surface, the cooperating inclined guiding surfaces being so inclined as to urge the seat with respect to the seat base as to establish the wedge connection between the second and fourth fastening elements and complete the push in connection between the first and the third fastening elements.

9. The arrangement of claim 2, wherein the fourth fastening element includes an inclined guiding surface and the second fastening element on the seat has a correspondingly inclined cooperating guiding surface, the cooperating inclined guiding surfaces being so inclined as to urge the seat with respect to the seat base as to establish the wedge connection between the second and fourth fastening elements and complete the push in connection between the first and the third fastening elements.

10. The arrangement of claim 9, wherein the one of the first and third fastening elements having a hole therethrough is resilient, and wherein the first and third fastening elements on the one hand and the second and fourth fastening elements on the other hand are so placed and shaped that after the seat is fitted to the seat base, the resilient fastening element applies the spring force to the peg;

the one of the first and third fastening elements having a hole comprises a plate and before the plate is engaged by the peg and while the plate is in the unloaded state, it forms a small angle to a vertical plane through the seat and the seat base.

11. The arrangement of claim 2, wherein the seat base comprises at least one fastening strip extending across and connectable to the floor of the vehicle; a respective one of the third and fourth fastening elements being connected at spaced apart locations on the one fastening strip.

12. The arrangement of claim 11, wherein the fastening strip includes a first assembly guide element thereon disposed between the respective third and fourth fastening elements thereon;

at least the first fastening device including a complementary second assembly guide device engageable with the first assembly guide device on the fastening strip for guiding the first and third fastening elements to accomplish the push in connection.

13. The arrangement of claim 12, wherein the second guide device comprises a protruding tooth which protrudes toward the fastening strip and the first guide device on the fastening strip includes a guiding wall to be engaged by the tooth, whereby the wall guides the tooth for guiding the first fastening element toward the third fastening element for the push in connection.

14. The arrangement of claim 11, wherein there are two of the fastening strips extending across the vehicle and a respective set of the third and fourth fastening elements on each of the fastening strips;

the seat base further including elongated frame portions extending along the length of the vehicle to which the fastening strips are attached, and the frame portions, in turn, being securable to the vehicle for holding the seat base to the vehicle.

15. The arrangement of claim 14, further comprising two of the frame portions and two of the fastening strips of the arrangement forming a generally rectangular frame.

16. The arrangement of claim 1, wherein the vehicle has a door through which the seat is installed into the vehicle, and the first and third fastening elements being on the side of the vehicle away from the door through which the seat is introduced.

* * * * *